(12) United States Patent
Kim

(10) Patent No.: US 11,924,493 B2
(45) Date of Patent: Mar. 5, 2024

(54) HYBRID SERVER FOR PROVIDING VIDEOPHONE SERVICE AND METHOD OF OPERATING THE SAME

(71) Applicant: Mediarak System Inc., Seoul (KR)

(72) Inventor: Jea Bong Kim, Seoul (KR)

(73) Assignee: MEDIARAK SYSTEM INC., Seoul (KR)

( * ) Notice: Subject to any disclaimer, the term of this patent is extended or adjusted under 35 U.S.C. 154(b) by 0 days.

(21) Appl. No.: 17/949,804

(22) Filed: Sep. 21, 2022

(65) Prior Publication Data

US 2023/0291951 A1 Sep. 14, 2023

(30) Foreign Application Priority Data

Jan. 25, 2022 (KR) .................. 10-2022-0010634

(51) Int. Cl.
*H04N 21/2668* (2011.01)
*H04N 21/2343* (2011.01)

(52) U.S. Cl.
CPC ..... *H04N 21/2668* (2013.01); *H04N 21/2343* (2013.01)

(58) Field of Classification Search
CPC .................. H04N 21/2668; H04N 21/2343
See application file for complete search history.

(56) References Cited

U.S. PATENT DOCUMENTS

2022/0408122 A1* 12/2022 Khanna ............. H04N 21/2187

FOREIGN PATENT DOCUMENTS

| KR | 10-0867004 | 11/2008 |
| KR | 10-2015-0105058 | 9/2015 |
| KR | 10-2021-0124655 | 10/2021 |
| KR | 10-2348492 | 1/2022 |

* cited by examiner

*Primary Examiner* — Anthony Bantamoi
(74) *Attorney, Agent, or Firm* — KILE PARK REED & HOUTTEMAN PLLC

(57) ABSTRACT

The hybrid server includes a first server configured to separately receive individual video media streams of an audience from audience terminals as uploads, mix the received individual video media streams as one or more group video media streams, and forward the group video media streams as downloads and a second server configured to receive the group video media streams from the first server as uploads and receive a video media stream of a performer from a performance terminal as an upload. The second server selects any one of the group video media streams and the video media stream of the performer or combines the group video media streams and the video media stream of the performer and forwards the selected video stream or the combined video streams to the audience terminals.

5 Claims, 4 Drawing Sheets

HYBRID SERVER FOR PROVIDING VIDEOPHONE SERVICE AND METHOD OF OPERATING THE SAME

CROSS-REFERENCE TO RELATED APPLICATION(S)

This application claims priority to and the benefits of Korean Patent Application No. 10-2022-0010634, filed on Jan. 25, 2022, in the Korean Intellectual Property Office (KIPO), the entire contents of which are incorporated herein by reference.

BACKGROUND

1. Field of the Invention

The disclosure relates to a hybrid server for providing a videophone service and a method of operating the hybrid server, and more particularly, to a bidirectional server for improving the quality of a performance by simultaneously providing a performer's video and an audience's video on one screen using a server and a method of operating the server.

2. Description of the Related Art

Due to the recent pandemic, social distancing between people has grown, and society has been working in a more contactless manner.

Accordingly, performances such as concerts, recitals, lectures, plays, musicals, etc., conferences, seminars, meetings, school and institute classes, artistic and physical lesson programs, religious events, and worship services are not held at actual sites with crowds of spectators, but non-face-to-face contactless live performances and lectures are realized by providing a performer's video in real time to the audience's video terminals and the audience (viewers) providing their appearances and expressions in their houses and the like to the performer's video terminal so that the performer may see the audience's responses.

As a method for realizing such a contactless live performance or lecture, a method of distributing network traffic using a server rather than a web real-time communication (WebRTC) protocol, which is a peer-to-peer (P2P) scheme, is attracting attention.

The method of distributing network traffic using a server includes a selective forwarding unit (SFU) scheme in which a server selectively distributes network traffic to relay a media stream of a client and a multi-point control unit (MCU) scheme in which a server mixes network traffic and transmits the mixed network traffic to a video terminal.

The SFU scheme involves one upload and N downloads. The SFU scheme can provide a real-time characteristic, a high data speed, and high-definition videos but requires network traffic control, which results in a limit on the number of participants.

On the other hand, the MCU scheme involves one upload and one download. The MCU scheme has an advantage that network traffic consumption is low at a server. However, since a mixing operation is performed at a media server, there is a time delay due to computing operations, such as encoding, compression, etc., and the real-time characteristic is degraded accordingly.

Therefore, it is necessary to develop a bidirectional videophone service that provides a high-resolution service for events, such as performances, conferences, seminars, meetings, school and institute classes, artistic and physical lesson programs, religious events, worship services, etc., and enables a large number of audience members to simultaneously participate in the events in real time.

Korean Patent Publication No. 10-2021-0124655 "Server, method, and computer program for relaying videophone service" discloses a technology for determining whether it is necessary to interoperate with a media server on the basis of whether a first type of terminal and a second type of terminal have the same channel access type information (an SFU access type or an MCU access type), causing videophone services which employ different relay methods to interoperate with each other, and providing an extensible videophone service. However, there is no disclosure of a hybrid technology in which an SFU server and an MCU server are combined.

SUMMARY

The disclosure is directed to providing a bidirectional videophone service that provides a high-resolution service for events requiring high picture quality and held with over one hundred people, such as performances, conferences, seminars, meetings, school and institute classes, artistic and physical lesson programs, religious events, and worship services, and enables a large number of audience members to simultaneously participate in the events in real time.

According to an aspect of the disclosure, there is provided a hybrid server for providing a videophone service, the hybrid server including a first server configured to separately receive individual video media streams of an audience from audience terminals as uploads, mix the received individual video media streams as one or more group video media streams, and forward the group video media streams as downloads and a second server configured to receive the group video media streams from the first server as uploads and receive a video media stream of a performer from a performance terminal as an upload. The second server selects any one of the group video media streams and the video media stream of the performer or combines the group video media streams and the video media stream of the performer and forwards the selected video stream or the combined video streams to the audience terminals. Accordingly, the video of the performer and the videos of the audience are simultaneously provided in one screen so that the quality of the performance can be improved.

BRIEF DESCRIPTION OF THE DRAWINGS

The above and other objects, features and advantages of the disclosure will become more apparent to those of ordinary skill in the art by describing embodiments thereof in detail with reference to the accompanying drawings, in which.

DETAILED DESCRIPTION OF THE EMBODIMENTS

Figure 1:
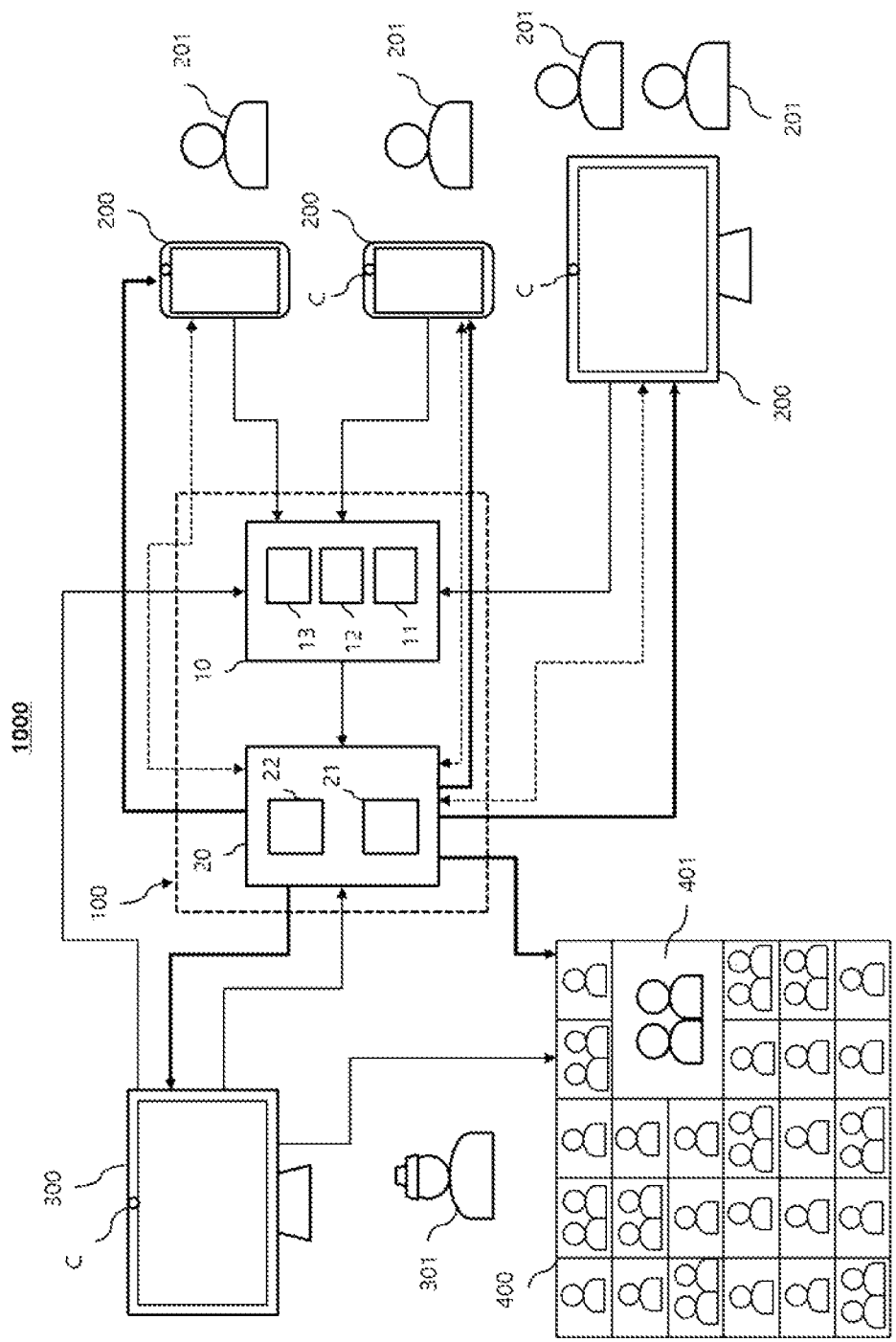
FIG. 1 is a schematic diagram showing a system including a hybrid server according to an embodiment.

Hereinafter, embodiments of the disclosure will be described in detail with reference to the accompanying drawings so that those of ordinary skill in the art can readily understand and implement the disclosure. In the description of the disclosure, when it is determined that the subject matter of the disclosure may be unnecessarily obscured by a related known function or element, detailed description thereof will be omitted. Terms used throughout the specification are defined in consideration of functions in embodiments of the disclosure and may be changed depending on the intention of a user or operator, precedent, etc. Accordingly, the terms should be defined on the basis of the overall content of the specification.

The above-described and additional aspects of the invention will become apparent from the following embodiments. It is understood that elements of selectively described aspects or selectively described embodiments, even though shown as a single integrated element in the drawings, may be combined with each other without limitations unless described otherwise or where it is apparent to those of ordinary skill in the art that the single element is technically contradictory.

Accordingly, embodiments described herein and configurations shown in the drawings are merely embodiments of the disclosure and do not represent all the technical spirit of the disclosure. Therefore, it should be understood that the embodiments can be replaced with various equivalents and modifications at the time of filing the present application.

FIG. 1 is a schematic diagram showing a system including a hybrid server according to an embodiment. As shown in the drawing, a hybrid server system 1000 may include a hybrid server 100 (the box with a broken line), audience terminals 200, a performance terminal 300, and an audience screen terminal 400, and the hybrid server 100 may include a first server 10 and a second server 20. The audience terminals 200, the performance terminal 300, and the audience screen terminal 400 may each include a microphone and a speaker in addition to a video display function.

The first server 10 may receive individual video media streams of audiences 201 from the audience terminals 200 as uploads, mix the uploaded individual video media streams as one or more group video media streams, and forward the group video media streams as downloads. Mixing is a process of mixing individual video frames as one or more group frames. To this end, mixing may include an encoding operation and a compression operation. For example, 144 individual video frames may be put together into one video frame.

The first server 10 may include a first memory 11, a mixer 12, and a first controller 13. The first memory 11 may store the uploaded individual video media streams of the audience 201, and the mixer 122 may generate one or more group streams by mixing the individual video media streams. The first controller 13 may control mixing, forwarding, and upload and download operations.

The audience terminals 200 may be devices that may record videos of the audience 201, forward the recorded videos, and display various videos. The audience terminals 200 may be smartphones, tablet personal computers (PCs), desktop computers, smart televisions (TVs), and Internet protocol (IP) TVs. The audience 201 may or may not allow their videos to be displayed through a graphics user interface (GUI) operation for turning a screen on or off or may withdraw from the service. When their own videos are displayed, the red GUI "ON" may be displayed.

The video recording, forwarding, and display may be performed by one integrated device or spatially separated devices.

The audience screen terminal 400 on which videos of the audience 201 are laid out and simultaneously displayed may be provided near, particularly behind, a performer 301. The audience screen terminal 400 may simultaneously display videos of the audience transmitted through the performance terminal 300 by the second server 20. Group video media streams of the audience may be forwarded by the first server 10.

The audience screen terminal 400 may receive video streams of the audience not through the performance terminal 300 but directly from the second server 20. In other words, the second server 20 may forward the group video media streams to the audience screen terminal 400. The second server 20 may receive the group video media streams of the audience from the first server 10. The audience screen terminal 400 may be disposed on the performance stage, and the performance terminal 300 may be disposed near the audience screen terminal 400.

The audience screen terminal 400 may enlarge a video 401 of a specific audience member with the manipulation of the performance terminal 300 by the performer 301 or a performance manager. This may facilitate interactive communication between the performer 301 and the specific audience member whose enlarged video 401 is displayed.

The second server 20 may receive the group video media streams from the first server as uploads and received a video media stream of the performer 301 from the performance terminal 300 as an upload. The second server 20 may include a second memory 21 and a second controller 22. The second memory 21 may store mixed group streams, and the second controller 22 may control operations such as transmission (forwarding), combining, laying out, etc. The capacity of the second memory 21 may be smaller than that of the first memory 11.

The second server 20 may select any one of the group video media streams and the video media stream of the performer 301 or combine the group video media streams and the video media stream of the performer and forward the selected video stream or the combined video streams to the audience terminals 200.

Combining may be an operation for simultaneously forwarding the group video media streams and the video media stream of the performer 301 so that the group video media streams and the video media stream of the performer 301 may be displayed on one screen.

The second controller 22 may not combine the group video media streams with the video media stream of the performer 301 and may selectively forward individually video media streams.

The performance terminal 300 may be a camera that records a video of the performer 301 and forwards the video, as well as a display device that includes a camera C and displays a recorded video. The performance terminal 300 may be disposed near the performer 301 and manipulated by the performer 301 or may be manipulated by another manager.

The first server 10 may be a multi-point control unit (MCU) server, a selective forwarding unit (SFU) server, and the second server 20 may be a selective forwarding unit (SFU) server. The SFU scheme involves one upload and N downloads and may provide a real-time characteristic, a high data speed, and high-definition videos. The MCU scheme involves one upload and one download, and network traffic consumption at a server is generally low. Accordingly, it is possible to forward 24 frames per second while minimizing the memory load of the second server 20, and thus a high-definition performer video can be rapidly transmitted.

The second server 20 may combine the group video media streams with the video media stream of the performer 301 and forward the combined video media streams to the audience terminals 200 as a download. The second server 20 may arrange videos in various layouts on the entire screen in the combining process.

According to an embodiment, depending on selective forwarding, the second server may forward video streams of the audience to the audience terminals 200 so that the audience videos are displayed or may forward a video stream of the performer 301 so that the performer video is displayed. Also, a combined video thereof may be displayed. An interactive live performance may be realized through selective forwarding of these three modes, and the performance can be more interesting accordingly. The selective forwarding of the second server 20 may be controlled by the performance terminal 300.

Further, the second server 20 may combine the group video media streams and the video media stream of the performer 301 and forward the combined video media streams to the performance terminal 300 as a download. The forwarding may be selective forwarding. Combining may be an operation of combining video frames of the audience mixed as one or more group frames and a video frame of the performer 301 into one video frame. Accordingly, the combined video frame may be simultaneously transmitted (forwarded) to the performance terminal 30 and the audience terminals 200.

Figure 2:
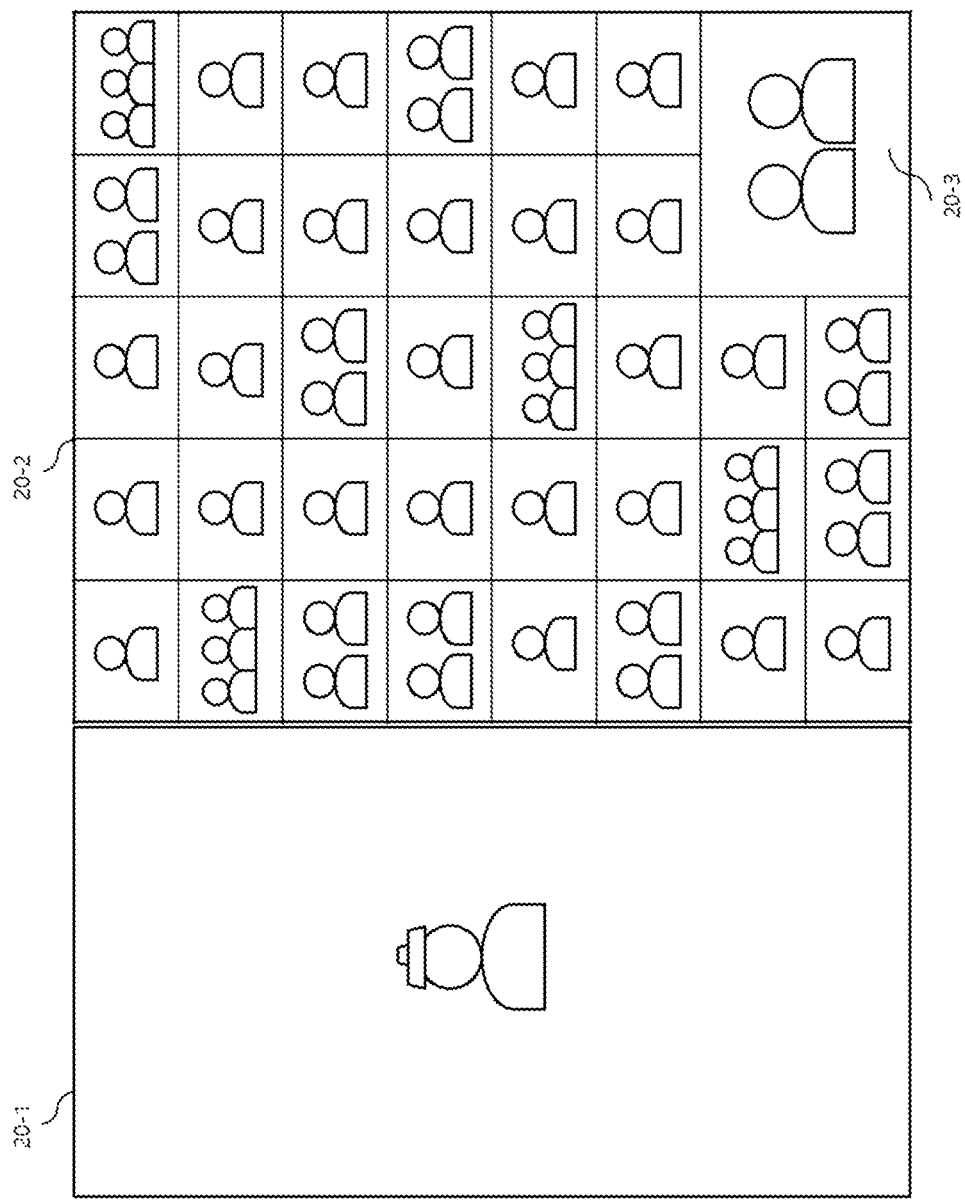
FIG. 2 is a schematic diagram showing a screen transmitted to an audience terminal by a second server according to an embodiment.

FIG. 2 is a schematic diagram showing a screen transmitted to an audience terminal by a second server according to an embodiment. The second server shown in FIG. 1 may receive mixed group video media streams from the first server as an upload, arrange the mixed group video media streams in an audience video region 20-2, receive a video media stream of a performer from a performance terminal as an upload, and arrange the video media stream in a performer video region 20-1, thereby performing secondary mixing. The second server may arrange the performer video region 20-1 on the left side and the audience video region 20-2 on the right side.

The performer video region 20-1 and the audience video region 20-2 may have different picture quality. The performer video region 20-1 may have higher picture quality than the audience video region 20-2. Accordingly, it is possible to see a high-quality performance video and relieve a load on the capacity of the second server.

According to an embodiment, the second server may convert a specific audience region into an enlarged region 20-3. The second server may generate such an enlarged region with an input from the performance terminal.

According to an embodiment, the second server may forward video streams of the audience to the audience terminal so that the audience videos are displayed or may forward a video stream of the performer so that the performer video is displayed. Also, a combined video thereof may be displayed as shown in FIG. 2.

The screen of the performance terminal 300 or the audience terminals 200 of FIG. 1 may have a function of turning a dual monitor mode on or off. Accordingly, a manager or an audience member may turn on the dual monitor mode to separate the performer video region and the audience video region 20-2 between two monitors. The embodiment in which the performer video region 20-1 and the audience video region 20-2 are separated between two monitors in the dual monitor mode may be included in the "combining."

Figure 3:
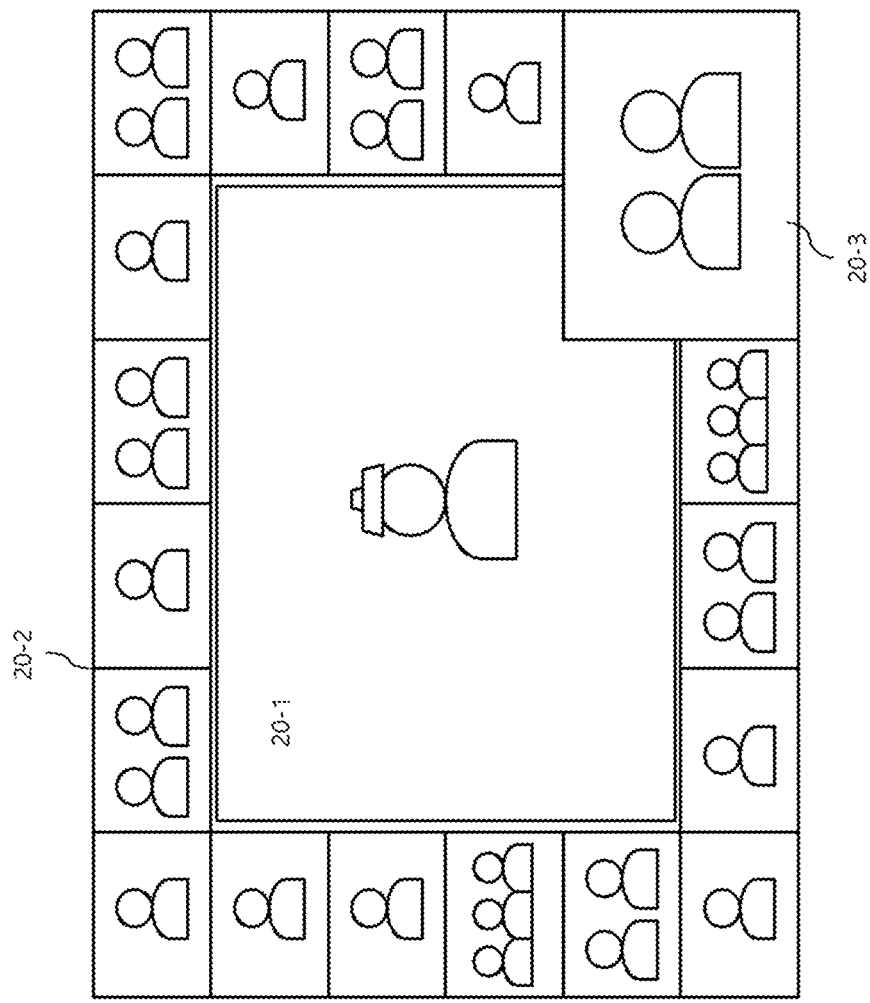
FIG. 3 is a schematic diagram showing a screen transmitted to an audience terminal by a second server according to another embodiment.

FIG. 3 is a schematic diagram showing a screen transmitted to an audience terminal by a second server according to another embodiment. The second server shown in FIG. 1 may receive mixed group video media streams from the first server as an upload, arrange the mixed group video media streams in an audience video region 20-2, receive a video media stream of a performer from a performance terminal as an upload, and arrange the video media stream in a performer video region 20-1, thereby performing secondary mixing. The second server may arrange the performer video region 20-1 at the center and the audience video region 20-2 at the margin.

According to an embodiment, the second server may convert a specific audience region into an enlarged region 20-3. As shown in the drawing, the enlarged region 20-3 of the audience region 20-2 may overlap the performer video region 20-1.

The second server may generate such an enlarged region with an input from the performance terminal and overlap the enlarged region and the performer video region 20-1.

Figure 4:
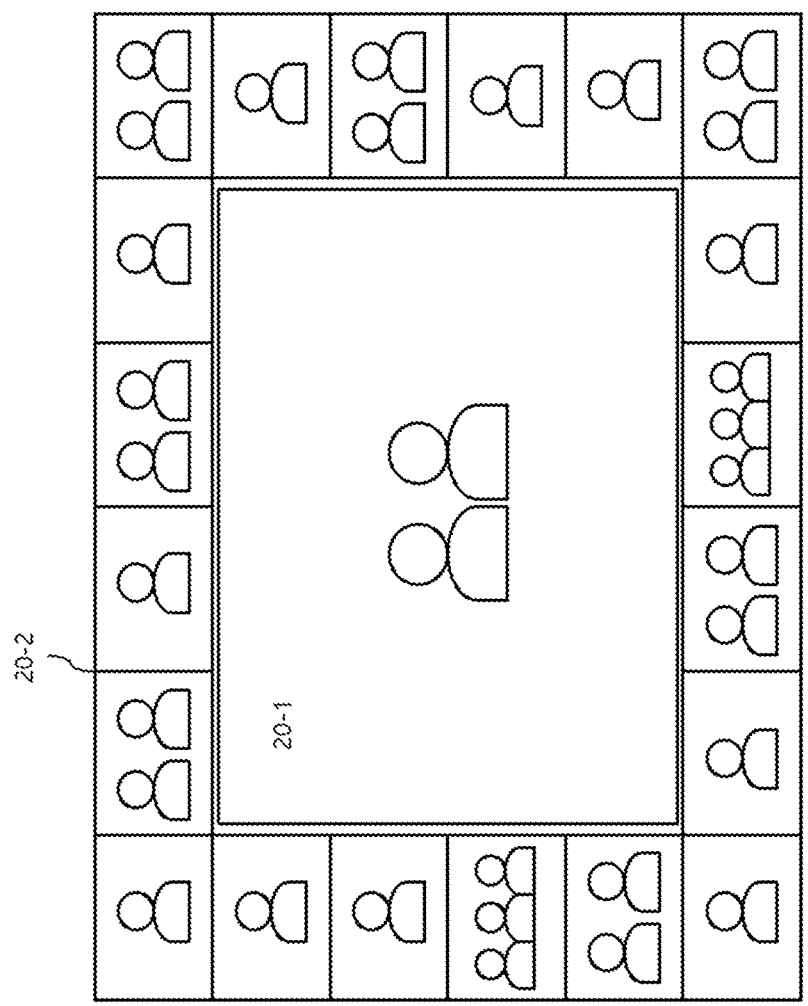
FIG. 4 is a schematic diagram showing a screen of a specific audience member directly transmitted by a second server according to another embodiment.

FIG. 4 is a schematic diagram showing a screen of a specific audience member directly transmitted by a second server according to another embodiment. As shown in the drawing, when a second server forwards (transmits) group video media streams to an audience terminal, the second server may place a video medium of a specific audience member in a performer video region 20-1 shown in FIG. 4.

A first server may receive the video medium of the specific audience member but may not mix the video medium with other videos. The second server may separately receive the video medium of the specific audience member from the first server and transmit the video medium to an audience terminal.

According to another embodiment, the second server may receive the video medium of the specific audience member not though the first server but directly from the specific audience terminal and forward the video medium to all audience terminals.

Accordingly, the video of the specific audience member may be transmitted in high picture quality. Such an operation of the second server may be switched by a performance terminal so that the first server and/or the second server may be controlled. This function may be useful when the specific audience member does an ad-lib performance.

A method of operating a hybrid server according to an embodiment may include an operation S100 in which a first server receives individual video media streams of an audience from audience terminals as uploads, mixes the individual video media streams, and forwards one or more group video media streams as downloads and an operation S200 in which a second server receives the group video media streams from the first server as uploads and receives a video media stream of a performer from a performance terminal as an upload. The method may further include an operation S300 in which the second server selects any one of the group video media streams and the video media stream of the performer or combines the group video media streams and the video media stream of the performer and forwards the selected video media stream or the combined video media streams to the audience terminals.

According to an embodiment, the method may further include an operation S400 in which the second server directly receives a video medium of a specific audience member not through the first server and forwards (transmits)

the video medium when the second server selects and forwards a group video media stream to the audience terminals.

According to an embodiment, the method may further include an operation S400 in which the second server combines the group video media streams and the video media stream of the performer and forwards the combined video media streams to the performance terminal as downloads.

The method of operating a hybrid server may be combined with FIGS. 1 to 4 and the descriptions and references of FIGS. 1 to 4.

The disclosure can provide a high-resolution service for events, such as performances, conferences, seminars, meetings, school and institute classes, artistic and physical lesson programs, religious events, worship services, etc., enable a large number of audience members to simultaneously participate in the service in real time, and provide a bidirectional videophone service at a high speed.

The disclosure collects videos of audience members through a first server and transmits a video of a performer to each terminal through a second server. Accordingly, it is possible to rapidly provide an overall high-definition video stream in real time while minimizing a loading load of the second server.

The disclosure can rapidly transmit a performer video with high picture quality and high sound quality while minimizing load on the memory of a second server, and thus it is possible to provide a good-quality contactless performance solution.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A hybrid server for providing a videophone service, the hybrid server comprising:
    a first server configured to separately receive individual video media streams of an audience from audience terminals as uploads, mix the received individual video media streams as one or more group video media streams, and forward the group video media streams as downloads; and
    a second server configured to receive the group video media streams from the first server as uploads and receive a video media stream of a performer from a performance terminal as an upload, wherein
    the second server selects any one of the group video media streams and the video media stream of the performer or combines the group video media streams and the video media stream of the performer and forwards the selected video stream or the combined video streams to the audience terminals and an audience screen terminal that the hybrid server provides a high-definition video stream in real time while minimizing a loading load of the second server,
    the audience screen terminal configured to lay out and display videos of audience members,
    the second server forwards the group video media streams to the audience screen terminal, and
    the first server is a multi-point control unit (MCU) server, and the second server is a selective forward unit (SFU) server.

2. The hybrid server of claim 1, wherein the second server selects one of the group video media streams and the video media stream of the performer or combines the group video media streams and the video media stream of the performer and forwards the selected video stream or the combined video streams to the performance terminal.

3. A method of operating a hybrid server, the method comprising
    an operation (S100) of receiving, by a first server, individual video media streams of an audience from audience terminals as uploads, mixing the individual video media streams as one or more group video media streams, and forwarding the group video media streams as downloads;
    an operation (S200) of receiving, by a second server, the group video media streams from the first server as uploads and receiving a video media stream of a performer from a performance terminal as an upload; and
    an operation (S300) of selecting, by the second server, any one of the group video media streams and the video media stream of the performer or combining the group video media streams and the video media stream of the performer and forwarding the selected video media stream or the combined video media streams to the audience terminals and an audience screen terminal such that the hybrid server provides a high-definition video stream in real time while minimizing a loading load of the second server, wherein
    the audience screen terminal configured to lay out and display videos of audience members, and
    the first server is a multi-point control unit (MCU) server, and the second server is a selective forwarding unit (SFU) server.

4. The method of claim 3, further comprising combining, by the second server, the group video media streams and the video media stream of the performer and forwarding the combined video media streams to the performance terminal as downloads.

5. The method of claim 3, further comprising an operation (S400) of directly receiving, when the second server selects and forwards the group video media streams to the audience terminals, video media of a specific audience member not through the first server and forwarding the video media.

* * * * *